April 3, 1962     T. HUG     3,028,476

HOT PLATE AND MAGNETIC STIRRER

Filed March 22, 1960

INVENTOR.
THEODORE HUG

BY Arthur H. Seidel

ATTORNEY

# United States Patent Office 3,028,476
Patented Apr. 3, 1962

3,028,476
HOT PLATE AND MAGNETIC STIRRER
Theodore Hug, Philadelphia, Pa., assignor to Arthur H. Thomas Company, Philadelphia, Pa., a corporation of Pennsylvania
Filed Mar. 22, 1960, Ser. No. 16,763
10 Claims. (Cl. 219—43)

This invention relates to hot plates and more particularly to a hot plate for use on magnetic stirrers so as to enable both stirring and heating of the contents of a laboratory vessel.

Magnetic stirring apparatus has gained widespread adoption. Such magnetic stirring apparatus permits variable speed stirring to be achieved within either closed or open laboratory vessels, and eliminates the need for mechanical coupling between the stirring bar and the prime mover.

However, up until the advent of the present invention magnetic stirring apparatus has suffered from one serious drawback, namely its inability to operate satisfactorily in conjunction with heating means. Attempts have been made to couple conventional heating means to mix magnetic stirrers, but the same have proved to be unsuccessful. Thus, the base of a laboratory vessel must be positioned relatively close to the driving rotating magnet if the driven stirring bar in the vessel is to be rotated effectively. Moreover, if an appreciable amount of heat from the heating means is transmitted to the motor of the magnetic stirrer, it will drastically reduce the useful operating life of said motor. Inasmuch as there are numerous laboratory applications in which both the application of heat and magnetic stirring are desirable, the above-referred to limitation on magnetic stirring apparatus has proved to be a serious problem.

It is an object of this invention to provide a novel hot plate and magnetic stirrer.

It is another object of this invention to provide a novel hot plate and magnetic stirrer which enables the combined unit to deliver both heating and magnetic stirring to a laboratory vessel carried thereon.

It is a further object of this invention to provide a hot plate and magnetic stirrer in which the motor of the magnetic stirring apparatus is protected from heat being delivered to the laboratory vessel carried thereon.

Other objects will appear hereinafter.

For the purpose of illustrating the invention there is shown in the drawings a form which is presently preferred; it being understood, however, that this invention is not limited to the precise arrangements and instrumentalities shown.

Referring now to the drawing in detail, where like numerals indicate like elements, there is shown in FIGURE 1 a vertical sectional view of a hot plate mounted on a magnetic stirrer designated generally as 10.

Figure 1:
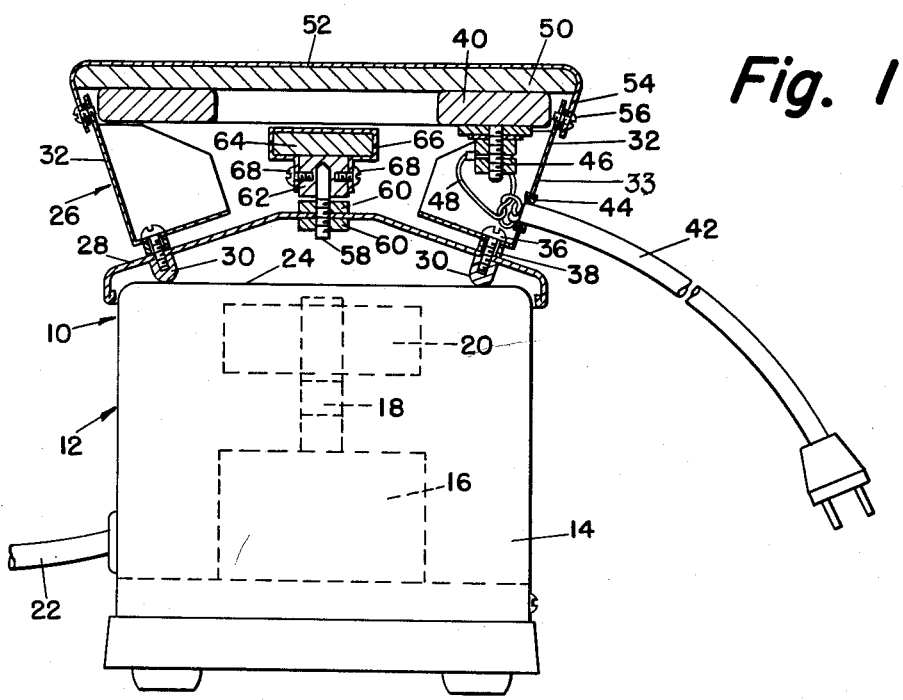
FIGURE 1 is a vertical section view of a hot plate mounted on a magnetic stirrer.
Figure 2:
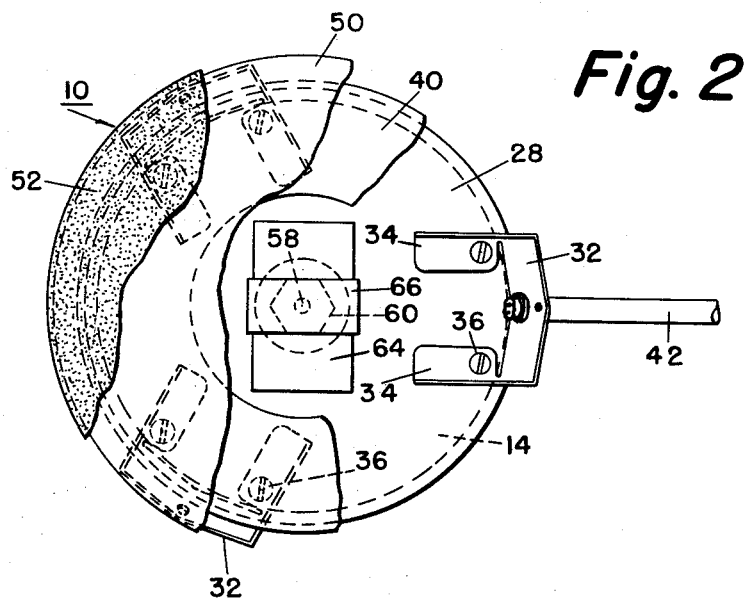
FIGURE 2 is a plan view looking down from above, with parts cut away for clarity of presentation, of the combination shown in FIGURE 1.

The magnetic stirrer 12 is of conventional construction and need not be described in detail. Such magnetic stirrer is commercially available and comprises the housing 14 within which is mounted the prime mover comprising the electric motor 16. The shaft 18 of electric motor 16 carries at its uppermost end a horizontally mounted permanent bar magnet 20. The housing 14 is preferably formed of aluminum or other non-magnetic material so as not to interfere with the operation of the rotating permanent bar magnet 20. A rheostat (not shown) may be connected to the electrical cord 22, which energizes the electric motor 16, whereby the speed of rotation of the shaft 18 may be selectively varied so as to selectively permit increase or decrease in the speed of rotation of the permanent bar magnet 20.

When the magnetic stirrer 12 is conventionally used, the laboratory vessel whose contents are to be stirred is placed on the top 24 of the housing 14. A short permanent bar magnet serves as the magnetized stirring bar, and is inserted within the laboratory vessel. Such magnetized stirring bar may be sealed within an inert material such as glass or may be coated with an inert plastic such as Teflon. Upon rotation of the permanent bar magnet 20, the stirring bar within the laboratory vessel will similarly rotate, with its speed of rotation being governed by the speed of rotation of the permanent bar magnet 20.

The magnetic stirrer 12 may be selectively converted, when so-desired, into a unit which permits combined magnetic stirring and heating of the contents of a laboratory vessel. In order to achieve heating of the laboratory vessel, a hot plate 26 is provided.

The hot plate 26 includes a radiation shield 28, which is preferably formed of non-magnetic stainless steel. The radiation shield 28 is shaped so that it straddles the upper portion of the housing 14. The radiation shield 28 is supported on the top 24 of the housing 14 by means of legs 30 made from stainless steel or other poor conductive material.

A plurality of support members 32 may be provided above the radiation shield 28, three such support members 32 being provided in the illustrated embodiment. Each of the support members 32 is preferably formed from non-magnetic stainless steel and comprises an upright 33 and flanges 34. The support members 32 are operatively disposed above the radiation shield 28 by means of screws 36 and spacers 38. As shown in FIGURE 1, it will be seen that screws 36 extend through the flanges 34 and into a blind threaded hole in the legs 30. Spacers 38, made from insulation material, are provided between the radiation shield 28 and the flanges 34. The spacers 38 are small tubular pieces which surround the screw shank and maintain the radiation shield 28 and the flanges 34 in spaced relation.

The heating means comprises a ring heater 40 of conventional construction, which is energized through the electric cord 42, and which has its heating elements disposed within a non-magnetic sheath. The ring heater 40 is in the form of an annulus, which is coaxially mounted in respect to the vertical axis of the housing 14 and the vertical axis of the shaft 18. One of the support members 32 is modified so as to carry the grommet 44 to support the electric cord 42. The ring heater 40 is provided with a depending threaded stud 46 having nuts threaded thereon. The wires 48 of the electric cord 42 are attached to the stud 46 between the nuts.

A heat sink 50 made from aluminum material is mounted above the ring heater 40. Above the heat sink 50 there is provided a sheet or top plate 52 of non-magnetic aluminum or stainless steel. The edges 54 of the top plate 52 consist of an inverted dish-shaped spinning. The edges 54 of the top plate 52 are provided with a plurality of holes therearound. Screws 56 connect the edges 54 and the uppermost edges of the support members 32. An insert is provided between the edges 54 and the uppermost edges of the support members 32 so that these elements are not in contact with one another.

Preferably, the parts 50, 52, and 56 are provided with a blackened surface. This blackened surface could be provided, for example, by an oxidation process. The blackened surface on these parts greatly enhances the heat absorption into the top and away from the lower components and the motor driven magnetic stirrer housing. This blackened surface also greatly improves the corrosion resistance of the top and the overall appearance of the whole unit.

The center of the radiation shield 28 is bored to provide an opening therethrough in which the spindle 58 is received. The spindle 58 is threaded and is provided with nuts 60 on opposite sides of the radiation plate 28. The spindle 58 is rotatably mounted in a bored blind cavity in the hub 62. The hub 62 is made from non-magnetic material and operatively supports on its upper surface a permanent magnet 64. The hub 62 and magnet 64 are maintained in operative disposition by a strap 66 which is disposed over the upper surface of the magnet 64 and connected to the hub 62 by screws 68.

The magnet 64 is preferably a single rectangular permanent bar magnet one-quarter inch by one inch by one and three-quarter inches in configuration. The optimum distance between the upper surface of the permanent magnet 64 and the lower surface of the heat sink 50 is approximately one-half inch. The major limiting factor involved is the loss of stirring speed caused by eddy currents set up in the heat sink 50 by the rotating magnetic field when the magnet 64 and the heat sink 50 are too close together.

The operation of the present invention is as follows:

When it is desired to both apply heat and magentic stirring to a laboratory vessel, the hot plate 26 is operatively mounted on the top 24 of housing 14.

Upon the energization of electric motor 16, the permanent bar magnet 20 will rotate. The rotation of the permanent bar magnet 20 will cause a similar rotation of the permanent bar magnet 64, which rotates easily, being mounted on the balance spindle 58. The rotation of the magnet 64 will in turn cause the magnetized stirring bar within the laboratory vessel to rotate.

Heat is delivered to the laboratory vessel through the heat sink 50 and top plate 52 which diffuse the heat from the ring heater 40. The magnetic stirrer 12 is protected from radiant heat emanating from the ring heater 40 by the radiation shield 28 which reflects such radiant heat away. The support members 32, the radiation shield 28 and the legs 30 are made from non-magnetic stainless steel which is a relatively poor conductor of heat. The provision of an inner space between the flanges 34 and the radiation shield 28 provides for air circulation to withdraw heat from the radiation shield 28 and the support members 32.

The present invention may be embodied in other specific forms without departing from the spirit or essential attributes thereof and, accordingly, reference should be made to the appended claims, rather than to the foregoing specification as indicating the scope of the invention.

I claim:

1. A hot plate and magnetic stirrer assembly for agitating and heating the contents of a vessel comprising a housing, an electric motor within said housing, a permanent first bar magnet rotatably driven by said motor and disposed beneath the top of said housing, a hot plate mounted on said housing, said hot plate including a permanent second bar magnet rotatably mounted thereon, said magnets being axially spaced along the longitudinal axis of said motor, the axial distance between said first magnet rotatably driven by said motor and the second magnet being such that the rotation of the first magnet rotatably drives the second magnet.

2. A structure as set forth in claim 1 including a radiation shield between said first and second magnets.

3. A structure as set forth in claim 2 wherein said hot plate includes heating means above said second magnet, said heating means being annular in shape, and a heat sink provided above said heating means.

4. A structure as set forth in claim 2 wherein said shield is provided with legs supported by the housing and a spindle on which said second magnet rotates.

5. A structure as set forth in claim 3 including a top plate mounted on the upper surface of said heat sink, said heat sink and said top plate having a blackened outer surface.

6. A hot plate and magnetic stirrer assembly for agitating and heating the contents of a vessel comprising a housing, an electric motor mounted within said housing, a first magnet rotatably driven by said motor and disposed beneath the top of said housing, a hot plate mounted on the top of said housing, said hot plate including a second rotatably mounted magnet, annular heating means concentrically mounted above said second magnet, a heat sink supported on the upper surface of said heating means, a radiation shield supported on said housing and beneath said second magnet, a spindle on said shield rotatably supporting said second magnet, and means providing for free circulation of air between said heating means, the atmosphere and said shield.

7. A hot plate comprising a radiation shield, a permanent bar magnet rotatably mounted on said radiation shield, an annular heating means mounted above said magnet, a heat sink supported on the upper surface of said heating means, said heating means is concentrically disposed with relation to said magnet, and said heat sink being a flat plate of non-magnetic material having a diameter greater than the outer diameter of said heating means.

8. A hot plate comprising a radiation shield, a permanent bar magnet rotatably mounted on said radiation shield, an annular heating means mounted above said magnet, a heat sink supported on the upper surface of said heating means, means providing for free circulation of air between said heating means and said shield.

9. A hot plate comprising a radiation shield, a permanent bar magnet rotatably mounted on said radiation shield, an annular heating means mounted above said magnet, a heat sink supported on the upper surface of said heating means, a top plate supported on the upper surface of said heat sink, the outer surface of said heat sink and said top plate being blackened so as to enhance the heat absorption thereto and away from the radiation shield.

10. A hot plate comprising a radiation shield of non-magnetic material, a permanent bar magnet rotatably mounted on an upper surface of said shield, an annular heating means, spaced support members supporting said heating means above said shield and providing for free circulation of air between said heating means and said shield, and a heat sink of non-magnetic material supported on the upper surface of said heating means.

References Cited in the file of this patent

UNITED STATES PATENTS

| | | |
|---|---|---|
| 2,356,784 | Graham | Aug. 29, 1944 |
| 2,691,717 | Huck | Oct. 12, 1954 |
| 2,828,950 | Stilwell | Apr. 1, 1958 |
| 2,837,320 | Baron | June 3, 1958 |

FOREIGN PATENTS

| | | |
|---|---|---|
| 131,024 | Australia | Jan. 18, 1949 |